(12) United States Patent
Cliff

(10) Patent No.: US 12,086,984 B2
(45) Date of Patent: *Sep. 10, 2024

(54) METHODS AND SYSTEMS FOR DETERMINING FITNESS FOR A DENTAL SPLINT AND FOR CAPTURING DIGITAL DATA FOR FABRICATING A DENTAL SPLINT

(71) Applicant: ASESSO HEALTH INC., Pleasanton, CA (US)

(72) Inventor: William C. Cliff, Pleasanton, CA (US)

(73) Assignee: Asesso Health Inc., Pleasanton, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/528,480

(22) Filed: Dec. 4, 2023

(65) Prior Publication Data
US 2024/0104735 A1 Mar. 28, 2024

Related U.S. Application Data

(63) Continuation of application No. 18/123,617, filed on Mar. 20, 2023, now Pat. No. 11,836,919, which is a continuation of application No. 16/846,060, filed on Apr. 10, 2020, now Pat. No. 11,610,302.

(60) Provisional application No. 62/832,847, filed on Apr. 11, 2019.

(51) Int. Cl.
| | | |
|---|---|---|
| G06T 7/00 | (2017.01) |
| G06T 7/80 | (2017.01) |
| G06T 11/00 | (2006.01) |
| H04N 23/60 | (2023.01) |

(52) U.S. Cl.
CPC .............. G06T 7/0012 (2013.01); G06T 7/80 (2017.01); G06T 11/00 (2013.01); H04N 23/60 (2023.01); *G06T 2200/24* (2013.01); *G06T 2207/10016* (2013.01); *G06T 2207/30036* (2013.01)

(58) Field of Classification Search
CPC ......... G06T 7/0012; G06T 7/80; G06T 11/00; G06T 2200/24; G06T 2207/10016; G06T 2207/30036; H04N 23/60; H04N 23/631; H04N 23/64; A61C 5/007
See application file for complete search history.

(56) References Cited

U.S. PATENT DOCUMENTS

| | | |
|---|---|---|
| 10,157,477 B2 | 12/2018 | Chen |
| 10,758,322 B2 * | 9/2020 | Pokotilov ............... G16H 20/40 |
| 11,024,431 B2 | 6/2021 | Stone-Collonge et al. |

(Continued)

*Primary Examiner* — Ping Y Hsieh
*Assistant Examiner* — Jose M Torres
(74) *Attorney, Agent, or Firm* — LOZA & LOZA LLP

(57) ABSTRACT

A method for capturing digital data for fabricating a dental splint involves displaying a GUI on a display of a smartphone that provides an alignment feature for a user to align a camera of the smartphone to a first position that captures teeth of a person, receiving digital video of the teeth, overlaying the alignment feature on the digital video of the teeth on the display to show alignment between the teeth and the alignment feature, capturing digital image information of the teeth while the alignment feature overlaps with the teeth, the captured digital image information including depth information, and transmitting the captured digital image information, including the depth information, from the smartphone for use in fabricating a dental splint.

16 Claims, 25 Drawing Sheets

(56) References Cited

U.S. PATENT DOCUMENTS

| | | | |
|---|---|---|---|
| 11,337,778 B2 * | 5/2022 | Katzman | G16H 20/00 |
| 11,348,232 B2 | 5/2022 | Powell et al. | |
| 2009/0098502 A1 | 4/2009 | Andreiko | |
| 2011/0269097 A1 | 11/2011 | Sporbert et al. | |
| 2017/0325689 A1 | 11/2017 | Salah et al. | |
| 2018/0125610 A1 | 5/2018 | Carrier, Jr. et al. | |
| 2019/0019187 A1 | 1/2019 | Miller et al. | |
| 2019/0269482 A1 * | 9/2019 | Shanjani | A61B 90/37 |

* cited by examiner ns of the smartphone relative to the teeth of a person doing a
self evaluation.
FIG. 9 is a graphical representation of the pattern of
movement of the smartphone relative to the teeth of the user
that corresponds to the movements shown in FIGS. 7A-7C
and 8A-8C.
FIG. 10 depicts a computer (e.g., a smartphone) that
includes a processor, memory, a communications interface,
and a sensor.

METHODS AND SYSTEMS FOR DETERMINING FITNESS FOR A DENTAL SPLINT AND FOR CAPTURING DIGITAL DATA FOR FABRICATING A DENTAL SPLINT

CROSS-REFERENCE TO RELATED CASE

This application is a Continuation of U.S. application Ser. No. 18/123,617, filed, Mar. 20, 2023, which is a Continuation of U.S. application Ser. No. 16/846,060, filed, Apr. 10, 2020, which is entitled to the benefit of provisional U.S. Patent Application Ser. No. 62/832,847, filed Apr. 11, 2019, which is incorporated by reference herein.

BACKGROUND

Dental splints are often used by people that suffer from bruxism and/or temporomandibular joint (TMJ) disorder. However, the process of obtaining a dental splint can be cumbersome and typically involves a trip to the office of a dental professional.

SUMMARY

In an embodiment, a method for determining fitness for a dental splint is disclosed. The method involves starting evaluation application on a smartphone, activating camera of the smartphone, moving the smartphone relative to the teeth of the person as directed by a GUI of the application on a display of smartphone, and deactivating the camera as directed by the GUI of the application.

Other aspects and advantages of embodiments of the present invention will become apparent from the following detailed description, taken in conjunction with the accompanying drawings, illustrated by way of example of the principles of the invention.

BRIEF DESCRIPTION OF THE DRAWINGS

FIGS. 2A-2-2C-2 depicts images of teeth that correspond to the movements of the camera relative to the teeth that are described with reference to FIGS. 1A-1C in the case of flat teeth.

DETAILED DESCRIPTION

Figure 1A:
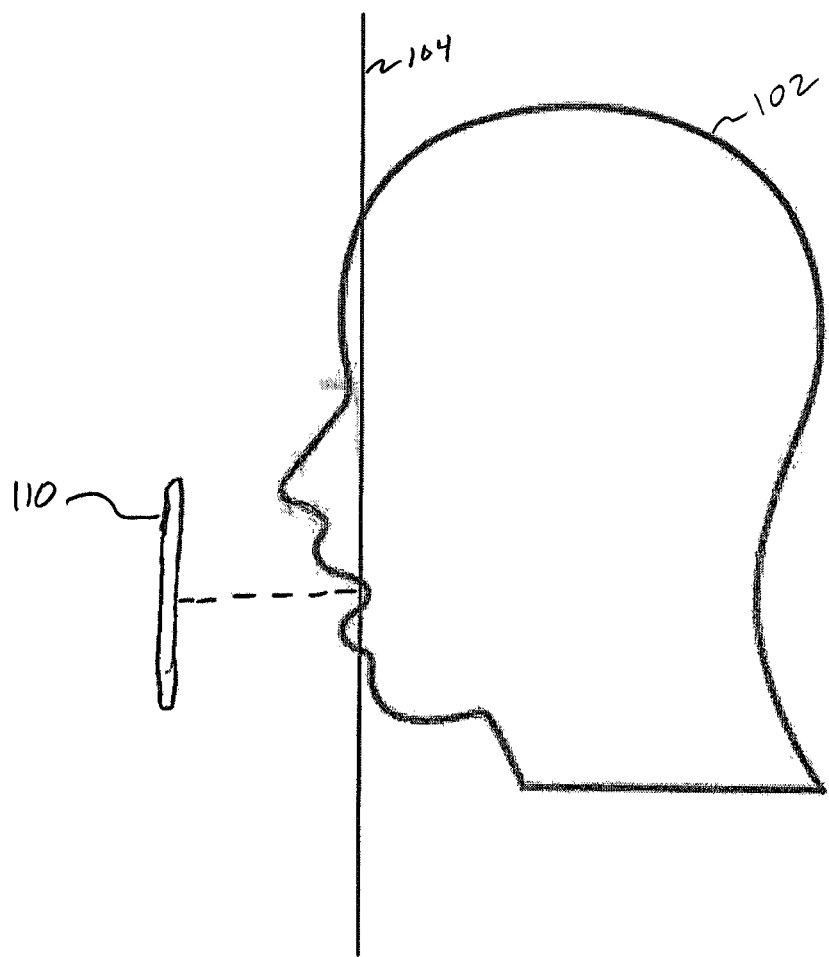
FIGS. 1A-1C depict a side view of movement of an image capture device relative to a head of a person.

As described herein, a smartphone and smartphone application, referred to herein as the application, are used to determine whether or not a person is a candidate for a dental splint, e.g., to determine whether a person may benefit from a dental splint. As described above, the degree of flatness of a person's teeth, for example, the lower anterior teeth, is a good indicator that the person may suffer from temporomandibular joint (TMJ) disorder and hence be a good candidate for a dental splint.

While a trained dental professional may be easily able to evaluate the degree of flatness of a person's teeth in an in-person exam, it can be difficult to evaluate the degree of flatness from pictures of a person's teeth. However, it has been realized that if taken from a particular angle, an image (or images) of a person's teeth can be effectively used to characterize the degree of flatness of a person's teeth. Therefore, in accordance with an embodiment of the invention, a smartphone with a camera is used in conjunction with an application to capture digital video of a person's teeth in a manner that enables the degree of flatness of the persons teeth to be evaluated. An embodiment of a method for determining fitness for a dental splint involves starting an evaluation application on a smartphone, activating a camera of the smartphone, holding the smartphone so that the camera captures the person's teeth and such that a display of the camera is visible to the user, moving the smartphone relative to the teeth of the person as directed by a graphical user interface (GUI) of the application on a display of smartphone, and deactivating the camera as directed by the GUI of the application. Another embodiment of a method for determining fitness for a dental splint involves displaying a GUI on a display of a smartphone that provides an alignment feature for a user to align a camera of the smartphone to a first position that captures teeth of a person, receiving digital video of the teeth of the person from the camera of the smartphone, overlaying the alignment feature on the digital video of the teeth on the display of the smartphone, moving the alignment feature on the screen (e.g., in a vertical direction) in a manner that causes the user to move the smartphone relative to the teeth (e.g., in a vertical direction) to maintain alignment with the alignment feature and capturing digital video of the teeth as the alignment feature is moved. In an on-phone evaluation embodiment, the method may involve evaluating the captured digital video of the teeth within the smartphone to determine a flatness parameter of the teeth and in an off-phone evaluation embodiment, the method may involve transmitting the captured video from the smartphone for evaluation to determine a flatness parameter of the teeth.

In one embodiment (e.g., an "on-phone/local" data evaluation embodiment), the captured digital video is evaluated locally on the smartphone by the application to determine a flatness parameter of the teeth (e.g., a degree of flatness), and the flatness parameter can be used to make a determination about the fitness of a person for a dental splint, e.g., whether or not a person is a good candidate for a dental splint and/or to provide feedback to the user via a graphical user interface (GUI) of the smartphone. In an embodiment, feedback from the application may include an indication as to whether or not the captured digital video was of sufficient quality to properly characterize the flatness of the teeth. In another embodiment (e.g., an "off-phone/remote" data evaluation embodiment), the captured digital video is transmitted from the smartphone for remote evaluation to determine a flatness parameter. In the case of remote evaluation, the application may perform an on-phone evaluation of the quality of the data and may provide an indication of the quality of the captured digital video on the graphical user interface before transmitting the captured digital video from the smartphone for remote evaluation.

In an embodiment, the person whose teeth are being evaluated can hold the smartphone and interact with the application, referred to herein as "self evaluation." For example, in a self evaluation, the smartphone is held by the person whose teeth are being evaluated and a "front-facing" or "selfie" camera of the smartphone is used to capture digital video of their teeth.

In another embodiment, the person whose teeth are being evaluated is assisted by another person that holds the smartphone and interacts with the application, referred to as "assisted evaluation." For example, the smartphone held by someone else and a "rear-facing" camera of the smartphone is used to capture the digital video.

An example of a technique for determining the fitness for a dental splint is described below with reference to FIGS. 1A-3C.

FIG. 1A is a side view of the head 102 of a person, where the person has their mouth open in a manner that exposes the person's teeth, including, the persons lower anterior teeth. FIG. 1A also illustrates a side view of a smartphone 110 that is being used for the evaluation. As mentioned above, the smartphone could be held by the person shown in the figure ("self evaluation") or the smartphone could be held by another person ("assisted evaluation"). In the example, the smartphone is held at a first angle relative to the person's teeth (such as 90° to a vertical axis (y-axis) 104 as illustrated in FIG. 1A). Although the initial position is illustrated as 90°, other initial positions are possible. In an embodiment, the camera of the smartphone is activated and a graphical user interface is displayed on the smartphone that provides an alignment feature that is used to cause the user to perform a desired movement of the camera. Example movements of the camera relative to the teeth are described with reference to FIGS. 1A-1C, corresponding image data is described with reference to FIGS. 2A-2C, and features of the application graphical user interface are described with reference to FIGS. 3A-3C.

Figures 1, 2A:
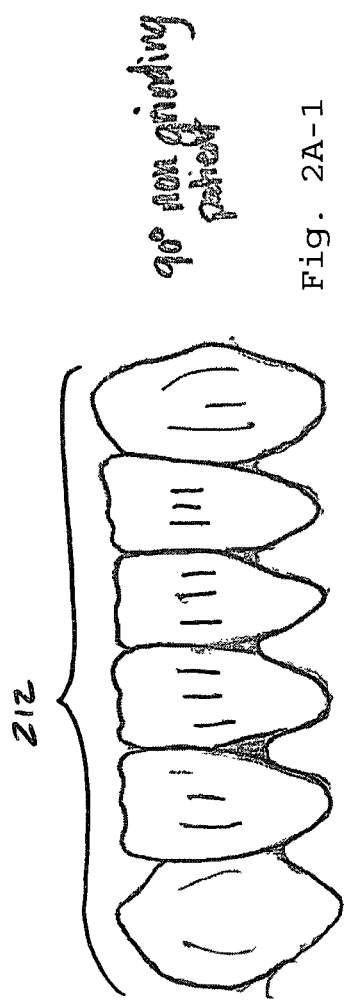
FIGS. 2A-1-2C-1 depicts images of teeth that correspond to the movements of the camera relative to the teeth that are described with reference to FIGS. 1A-1C in the case of normal teeth.
Figures 1, 2B:
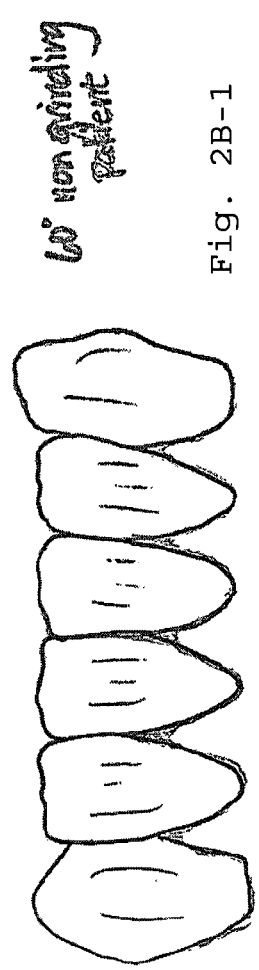
Figures 1, 2C:
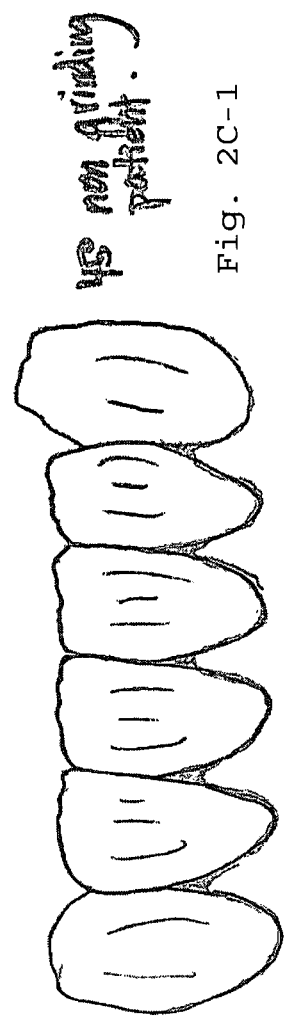
Figures 2, 2A, 2B, 2C:
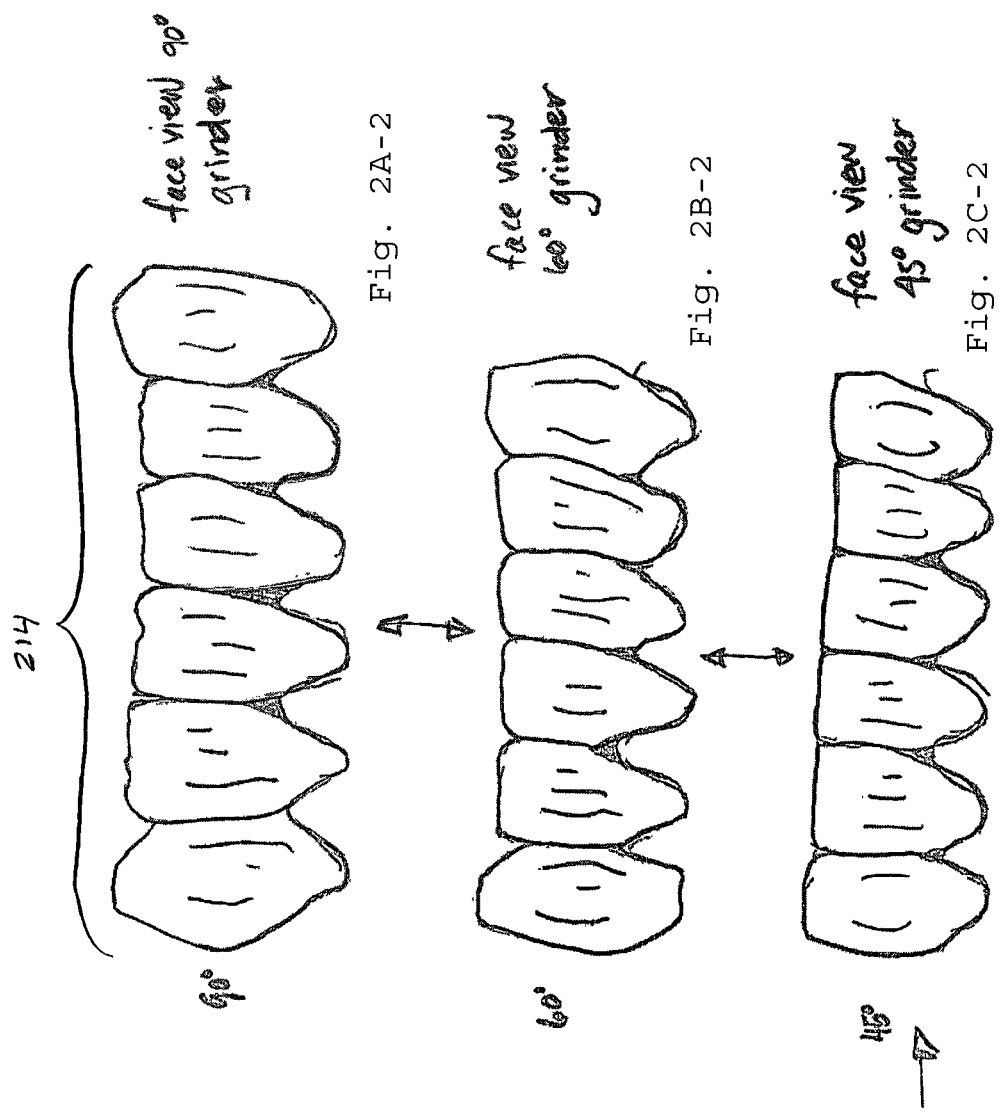

FIGS. 2A-1 and 2A-2 illustrate example views of the lower front teeth 212 and 214 that are captured when the smartphone is in the position illustrated in FIG. 1A. The example views include a case in which the front teeth exhibit a normal degree of flatness (FIG. 2A-1, 212) and a case in which the front teeth exhibit a high degree of flatness (FIG. 2A-2, 214). As illustrated in the example of FIGS. 2A-1 and 2A-2, when captured from the position illustrated in FIG. 1A, the degree of flatness of the teeth is not readily apparent. Indeed in the example of FIGS. 2A-1 and 2A-2 it may not be possible to distinguish a difference in the degree of flatness between the two different sets of teeth.

Figure 1B:
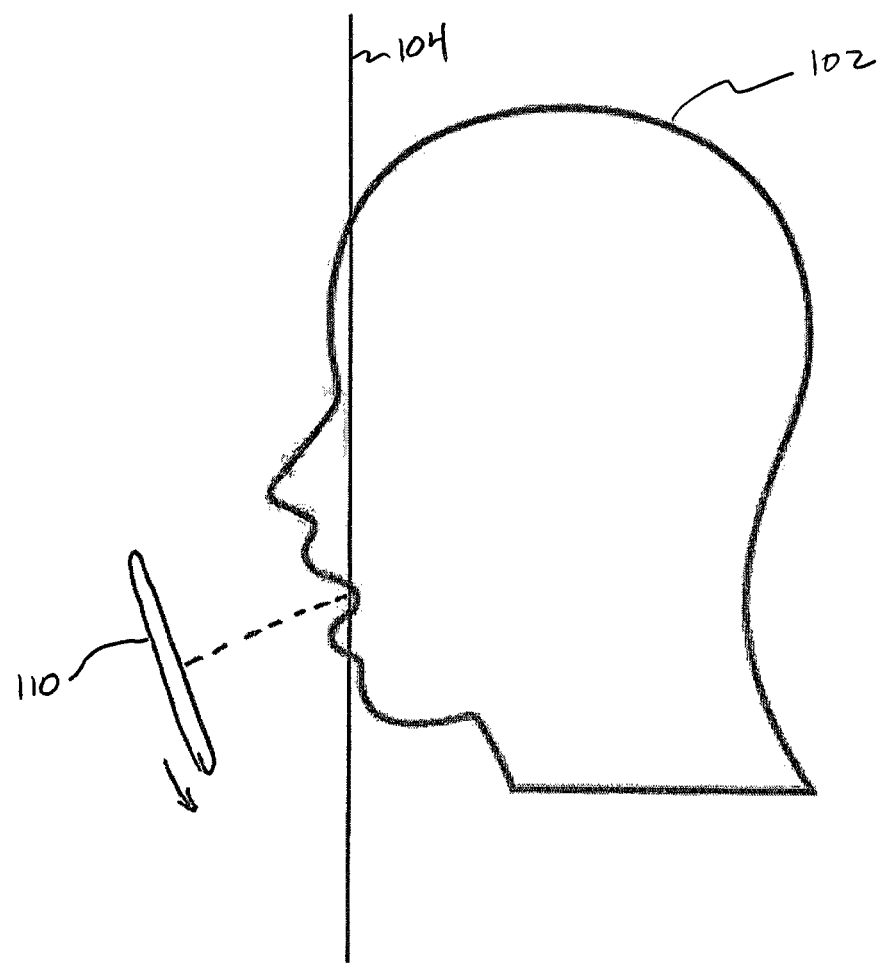

Referring back to FIG. 1A, at some point in time after the initial position is established, the application running on the smartphone 110 will prompt the user to move the smartphone relative to the teeth of the person. For example, the application will cause the person to move the smartphone in a downward angle relative to the teeth. FIG. 1B is a side view of the head where the angle of the smartphone relative to the teeth has changed from approximately 90° to a vertical axis 104 to approximately 75° relative to the vertical axis 104. In an embodiment, the smartphone is held generally in the same position relative to rotation about the Y-axis such that the camera of the smartphone stays directed at the teeth. FIGS. 2B-1 and 2B-2 illustrate example views of the teeth from FIGS. 2A-1 and 2A-2 after the smartphone has moved into the position illustrated in FIG. 1B. As illustrated in the example of FIGS. 2B-1 and 2B-2, the difference in the degree of flatness between the two different sets of teeth 212 and 214 is still not readily apparent. Although the difference is not readily apparent, the difference may be starting to become apparent, e.g., visible to the human eye and/or detectable by image data processing.

Figure 1C:
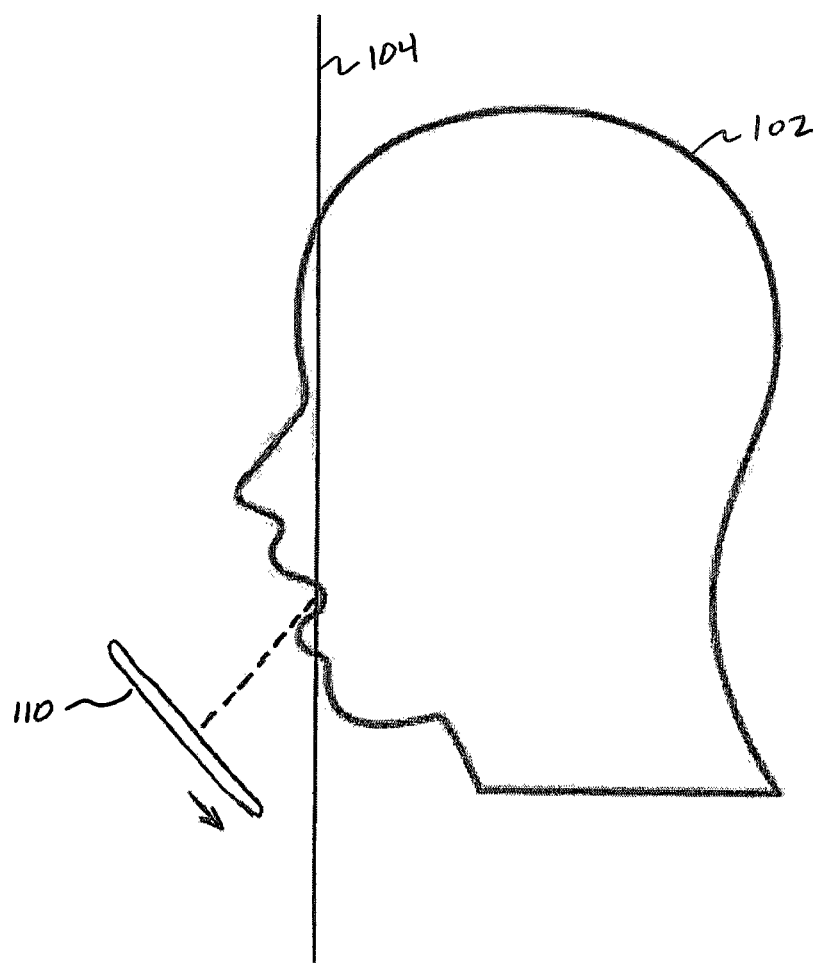

After the position illustrated in FIG. 1B is reached, the application will continue to prompt the user to move the smartphone 110 in the same direction relative to the teeth of the person. FIG. 1C is a side view of the head where the angle of the smartphone relative to the teeth has changed from approximately 75° to approximately 45° relative to the vertical axis 104. Again, the smartphone continues to be held in the same position relative to rotation about the Y-axis 104 such that the camera stays directed at the teeth.

FIGS. 2C-1 and 2C-2 illustrate example views of the teeth 212 and 214 from FIGS. 2A-1, 2A-2, 2B-1, and 2B-2, respectively, after the smartphone has been moved into the position illustrated in FIG. 1C. As illustrated in the example of FIGS. 2C-1 and 2C-2, a difference in the degree of flatness between the two different sets of teeth has become more readily apparent, e.g., visible to the human eye and/or detectable by image data processing. For example, the set of teeth in FIG. 2C-1 shows a normal degree of flatness while the set of teeth in FIG. 2C-2 shows a high degree of flatness.

As illustrated in FIGS. 1A-2C-2, the degree of flatness of the lower front teeth does not become apparent until the image data (e.g., digital video) is captured at a certain angle relative to the teeth. Additionally, it has been found that the ideal angle for digital video capture may vary from person to person. Thus, it is important that the application guides the user through a digital video capture process that involves an angular sweep through a range of vertical angles.

Although a range of angles from 90° to 45° is described with reference to FIGS. 1A-2C-2, the range of angles may vary. For example, it may be that a range of angles beyond 90° relative to the Y-axis 104 is desired and/or a range of angles below 45° relative to the y-axis is desired. Additionally, other movement patterns may be used, e.g., an up-and-down pattern, to capture digital video that enables flatness of teeth to be characterized.

Additionally, although three positions are illustrated and described with reference to FIGS. 1A-2C-2, it should be appreciated that digital video is captured continuously over the range of angles. In other embodiments, still digital images may be captured at different angles to capture image data sufficient to characterize the degree of flatness. Although a particular movement pattern of the smartphone and alignment feature is described, other movement patterns and alignment features are possible. It is desirable to have the digital video captured over a range of positions as the best angle to identify the degree of flatness may vary from person to person. Additionally, in an embodiment, the alignment feature moves at a rate that enables the capture of digital data at a rate that is amenable to digital data analysis sufficient to determine a flatness parameter. Although the above-described processes involve the capture of digital video, in other embodiments, techniques for determining fitness for a dental splint may utilize still images and/or depth information (e.g., as captured by a depth sensor using, for example, time-of-flight sensing) in part or in whole.

Figure 3A:
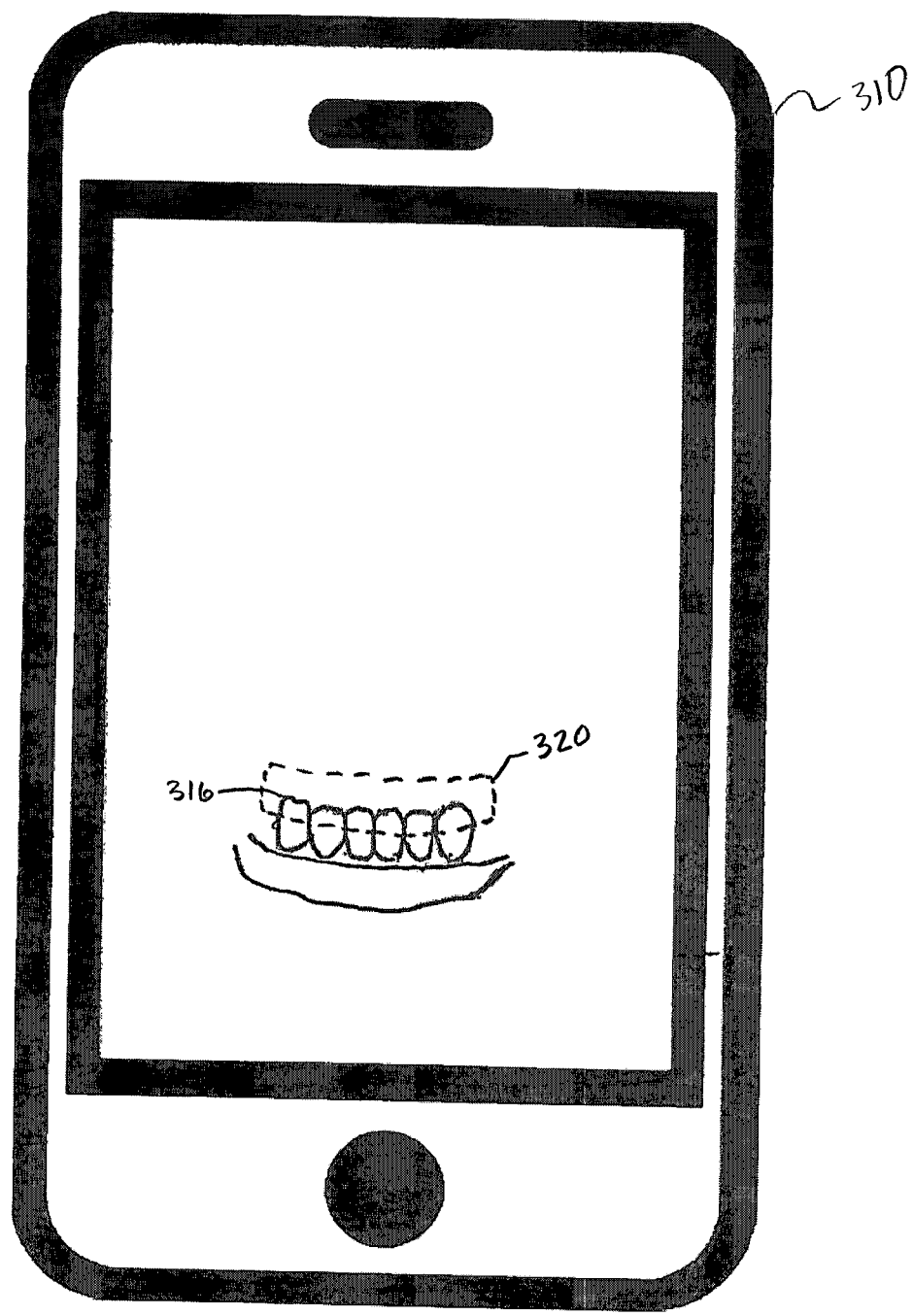
FIGS. 3A-3C depict features of an application graphical user interface this is used to capture digital image information of teeth.
Figure 3B:
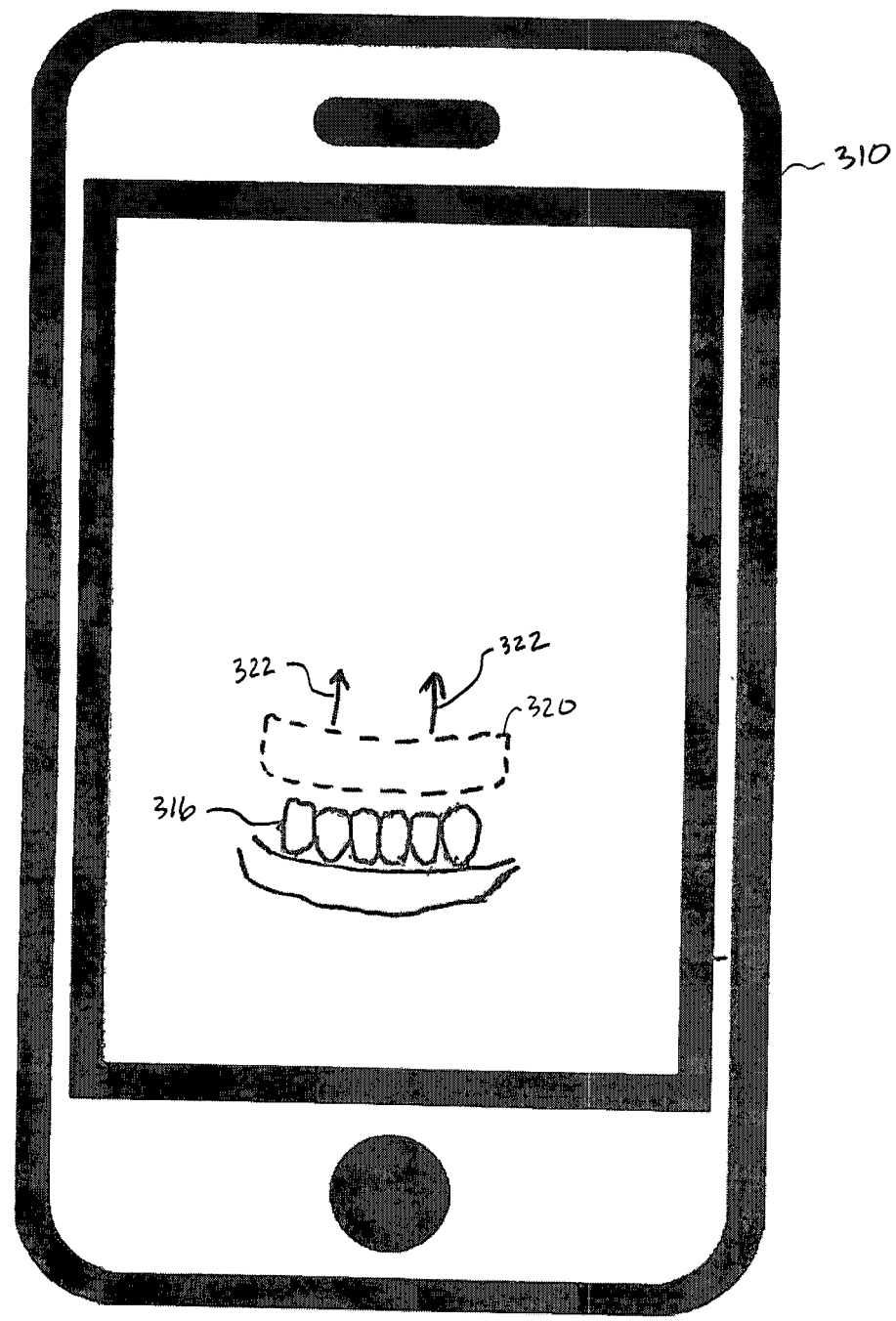
Figure 3C:
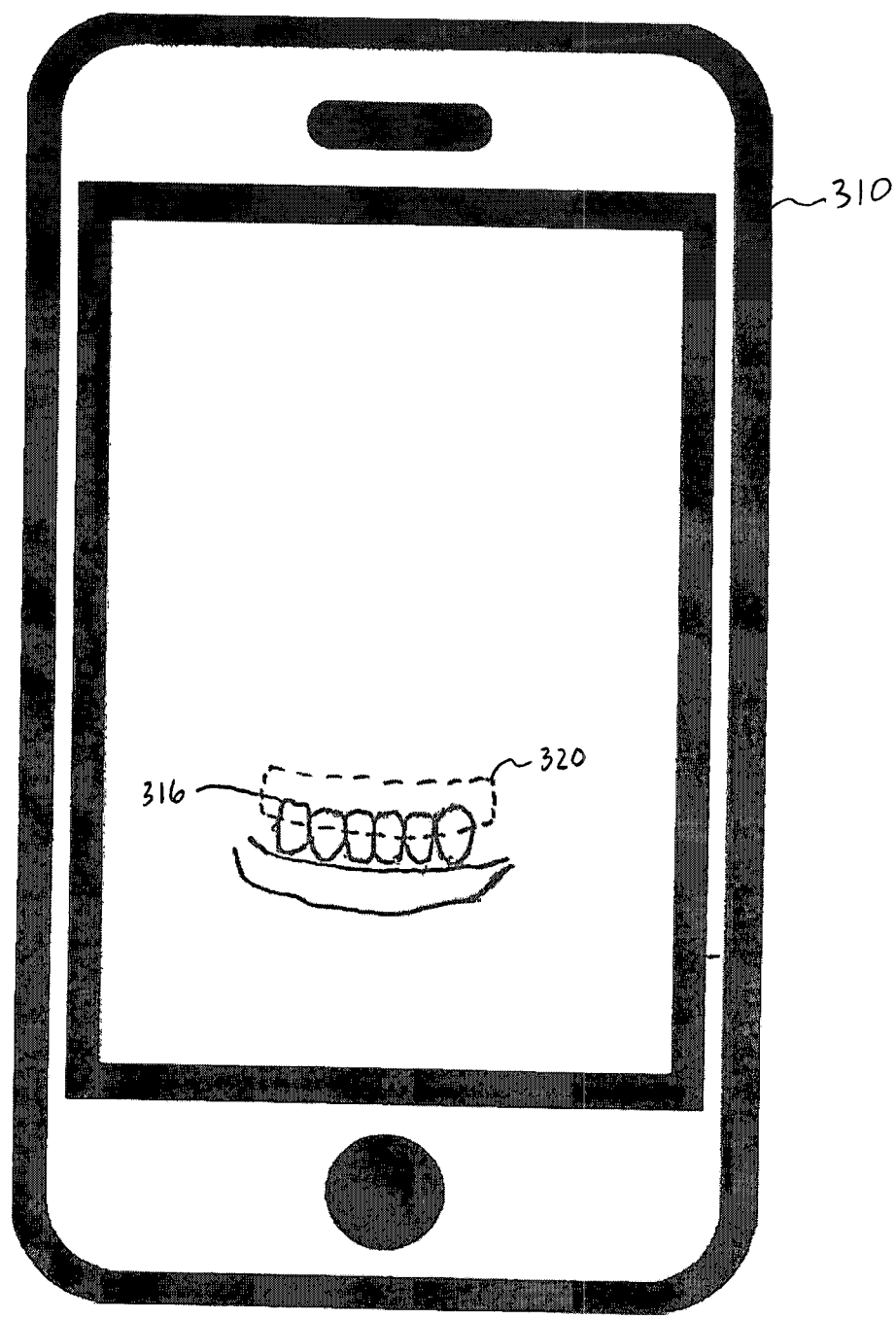

As stated above, an application running on a smartphone is used to direct the user to capture digital video at the desired positions. FIGS. 3A-3C illustrate a graphical user interface of the application and digital video of a person's teeth 316 in which an alignment feature 320 of a graphical user interface is overlaid on the digital video of the teeth. Examples of FIGS. 3A-3C correspond to the examples described with reference to FIGS. 1A-2C-2. FIG. 3A depicts a smartphone 310 and the alignment feature 320 of a graphical user interface overlaid on digital video of the teeth 316. In the example of FIG. 3A, the alignment feature is a dashed line box that is configured to cause the user to align the smartphone such that the lower teeth are within the dashed line box. In an embodiment, the application is configured to move the dashed line box on the display in a manner that causes the user to move the smartphone, e.g., in a vertical direction, to maintain alignment between the teeth on the display and the alignment feature. Although the alignment feature is a dashed line box in this example, other graphical features could be used as the alignment feature.

FIG. 3B illustrates movement of the alignment feature on the graphical user interface relative to the teeth (e.g., as indicated by the arrows 322) to cause the user to move the smartphone relative to the teeth. As the smartphone is moved in a vertical direction, the smartphone will pass through the position illustrated in FIG. 1B.

FIG. 3C illustrates the alignment feature 320 relative to the teeth when the smartphone 310 is in the position illustrated in FIG. 1C. As shown in FIG. 3C, the teeth are aligned within the dashed line box of the alignment feature 320. In the example of FIG. 3C, the teeth could be similar to the examples shown in FIGS. 2C-1 and/or 2C-2.

Although an example of an alignment feature is described with reference to FIGS. 3A-3C, other arrangements of an alignment feature are possible. In addition, it is possible that more than one alignment feature is used.

Figure 4A:
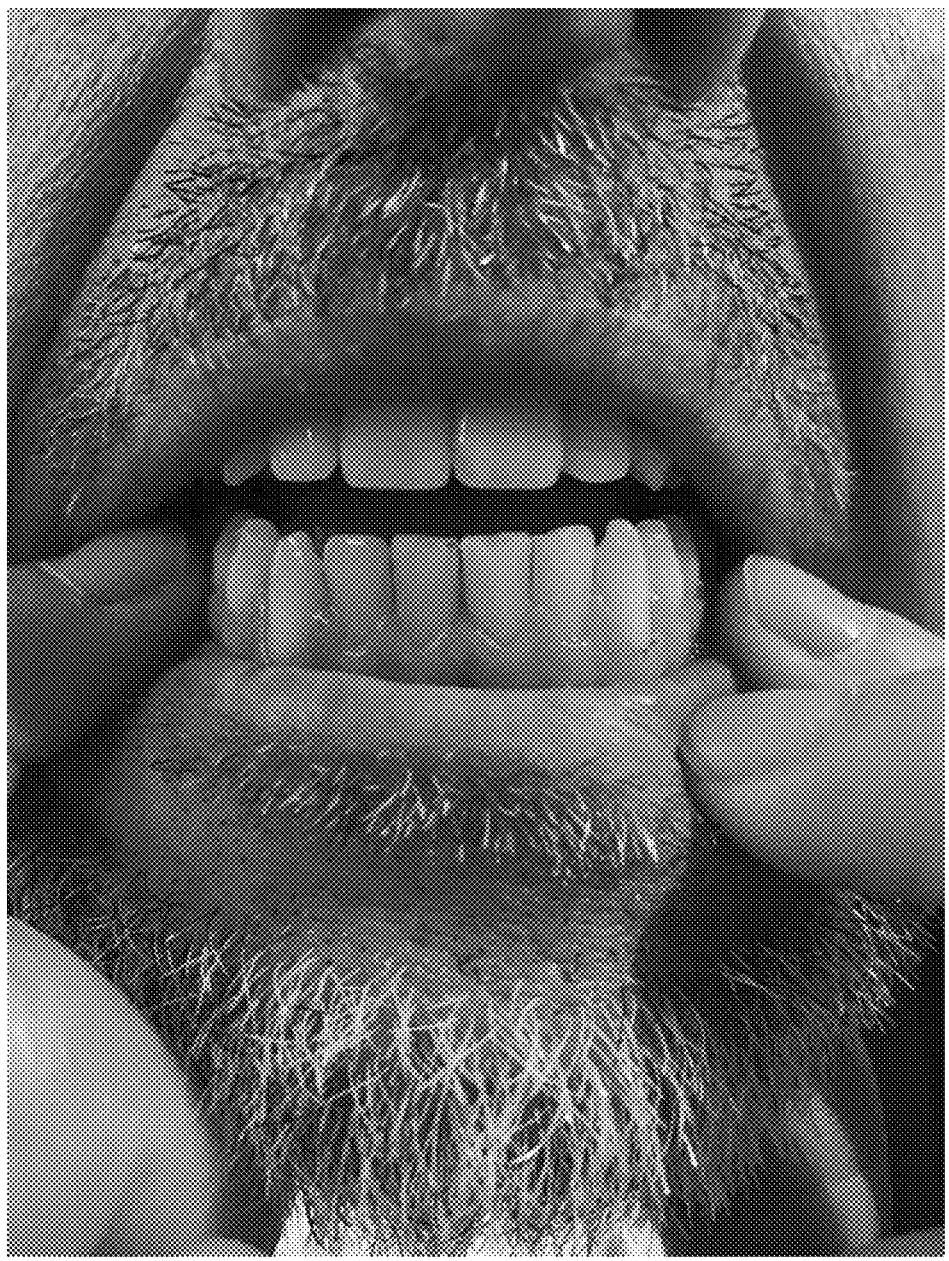
FIGS. 4A-4C are pictures that illustrate an example of digital image information captured at three different angles/positions for a set of teeth that exhibits relatively normal flatness.
Figure 4B:
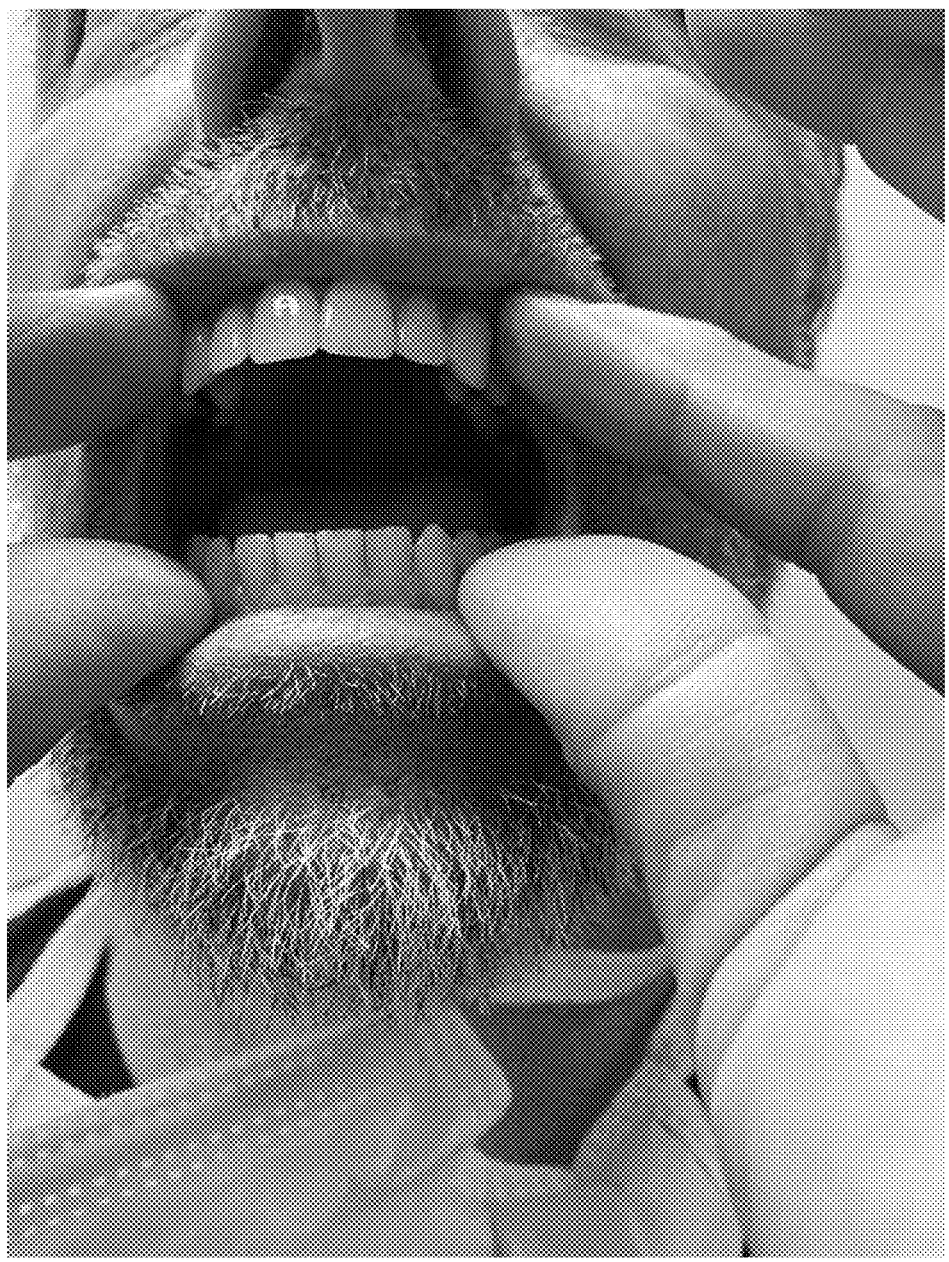
Figure 4C:
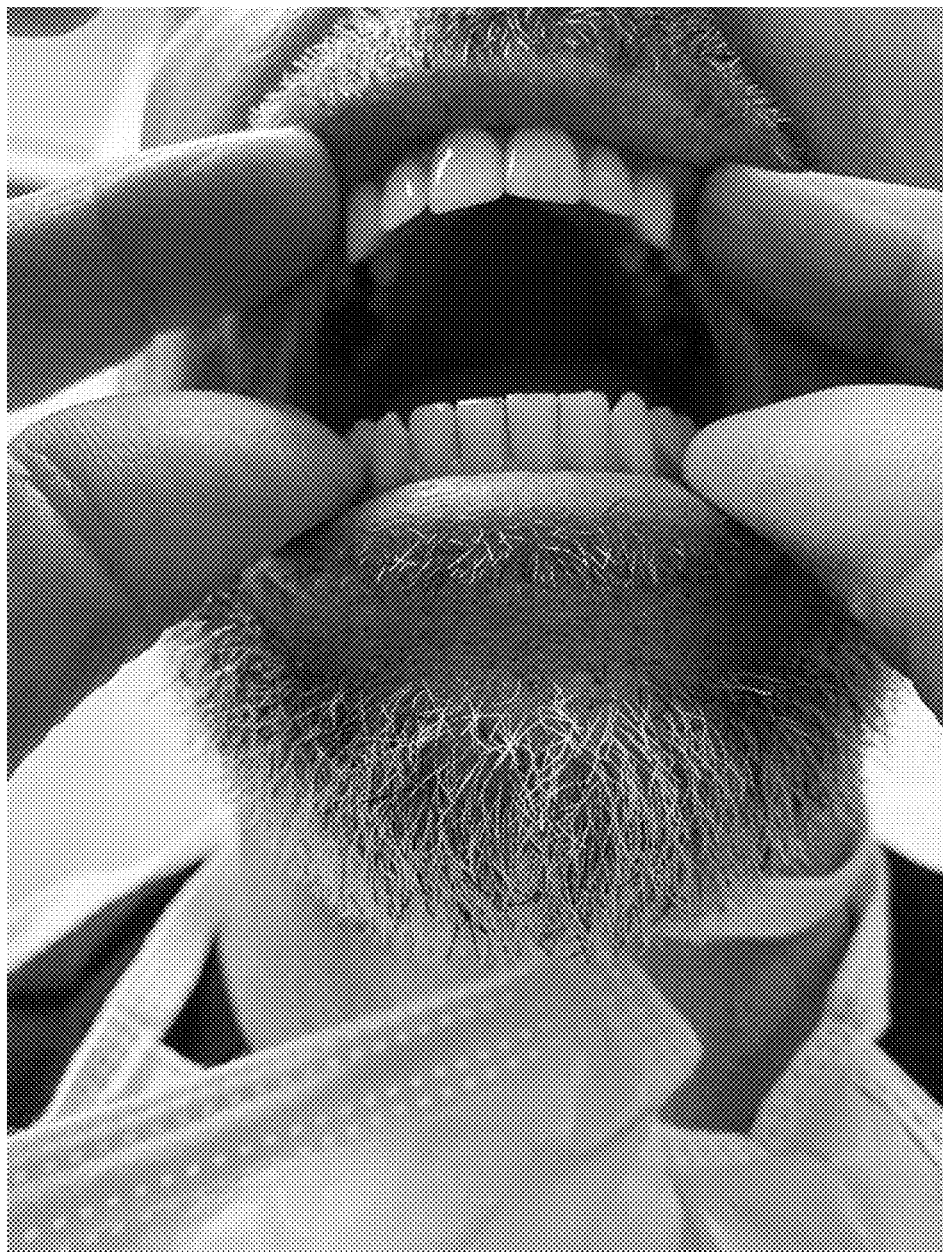
Figure 5A:
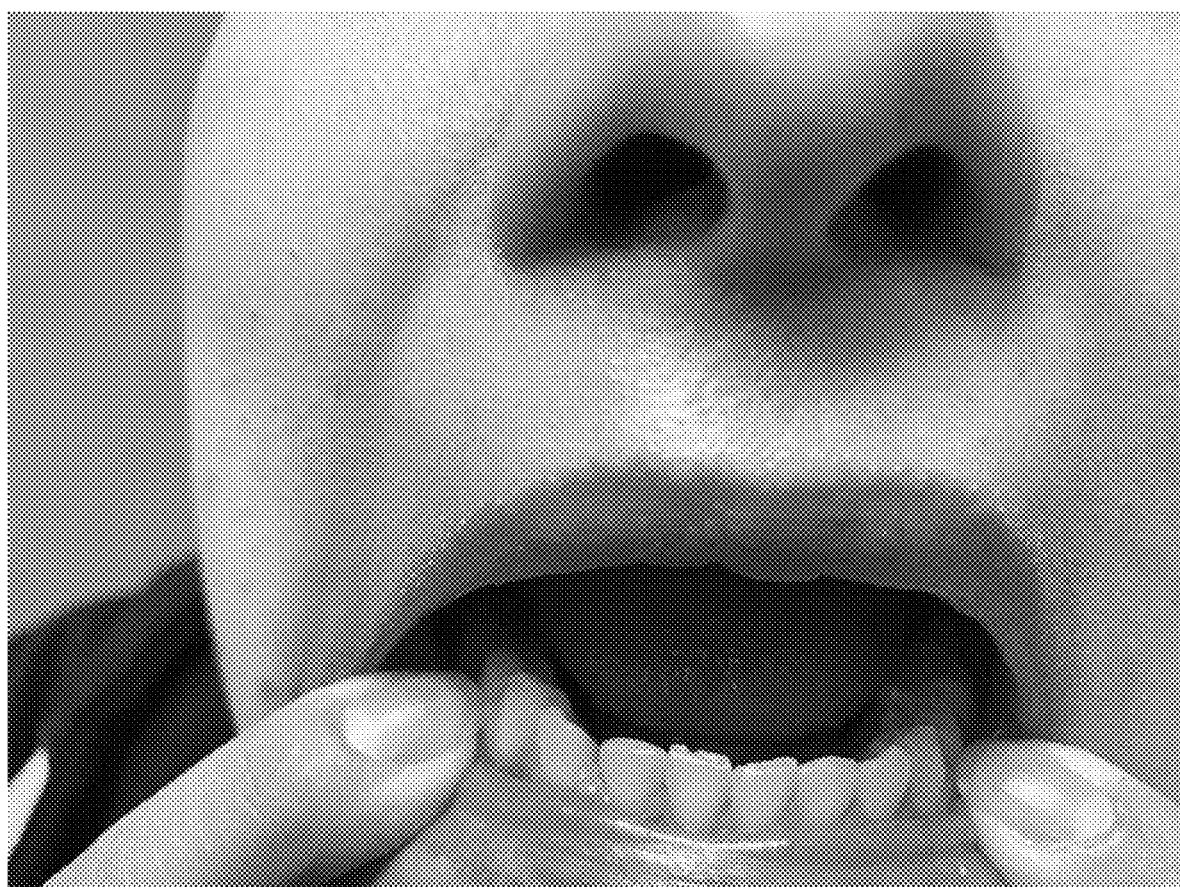
FIGS. 5A-5C are pictures that illustrate an example of digital video captured at three different angles/positions for a set of teeth that exhibit a relatively high degree of flatness.
Figure 5B:
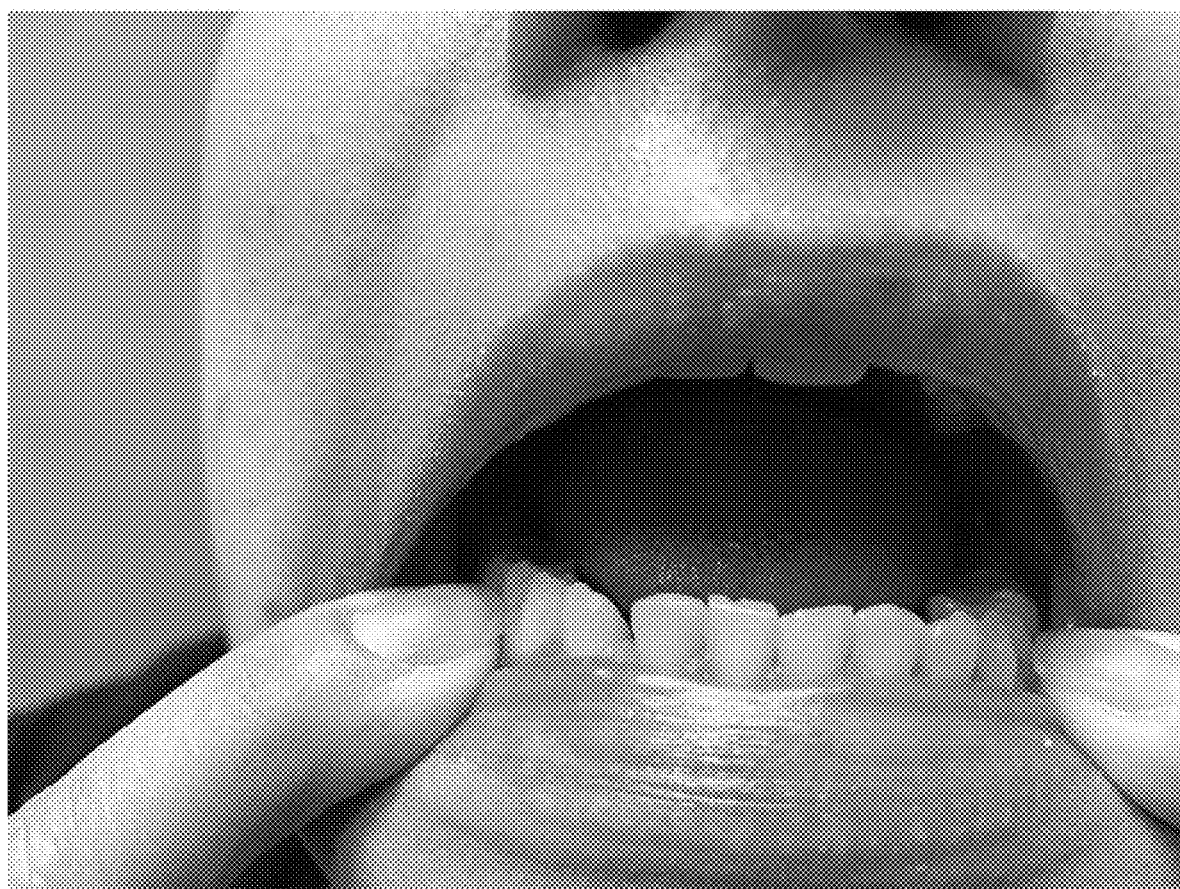
Figure 5C:
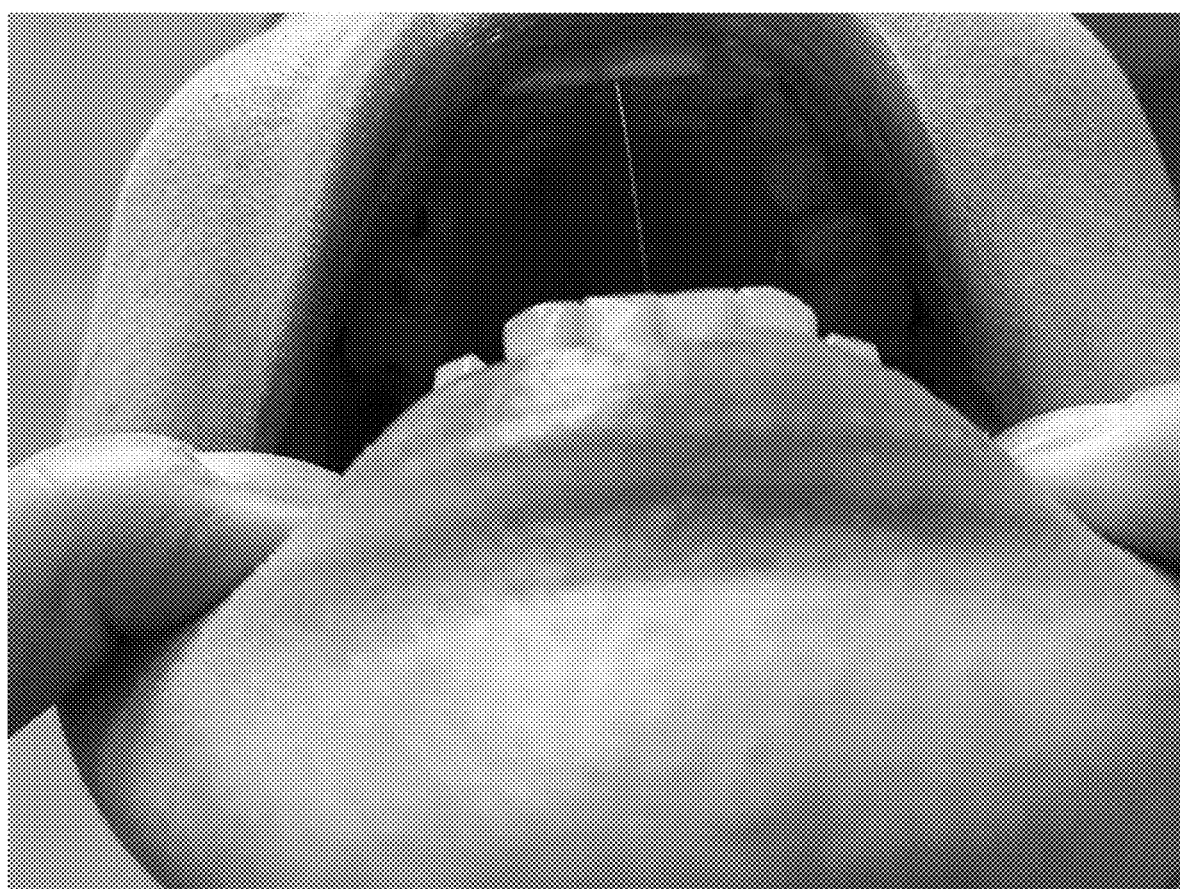
Figure 6A:
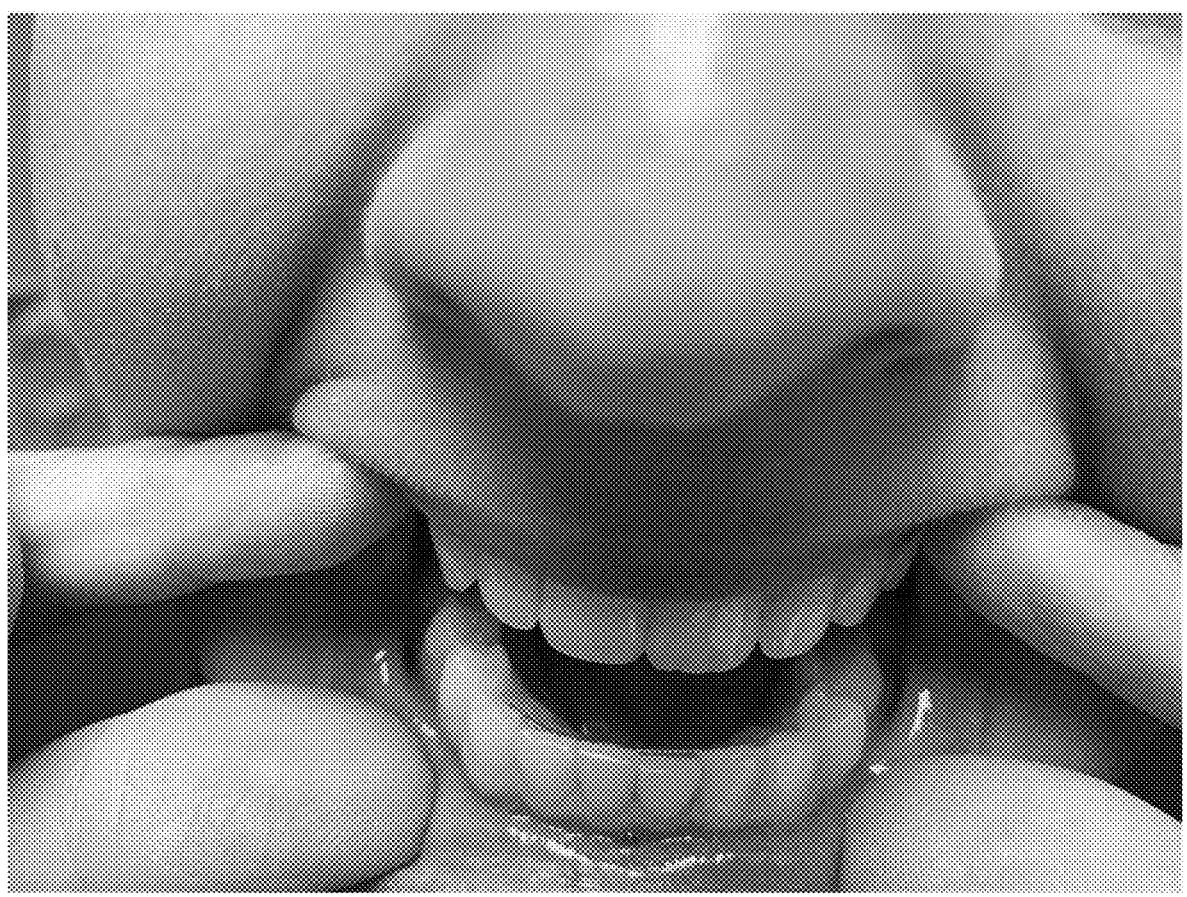
FIGS. 6A-6C are pictures that illustrate an example of digital video captured at three different angles/positions for another set of teeth that exhibit a relatively high degree of flatness.
Figure 6B:
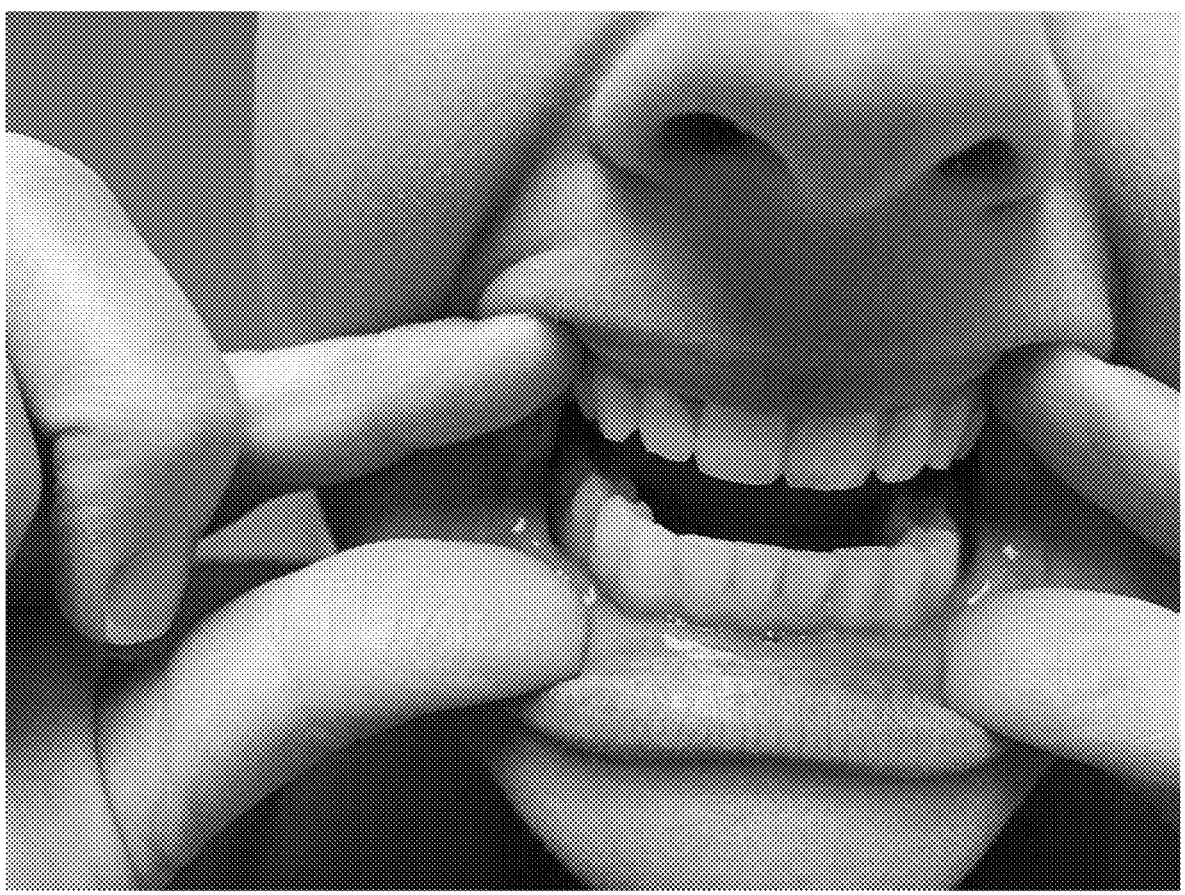
Figure 6C:
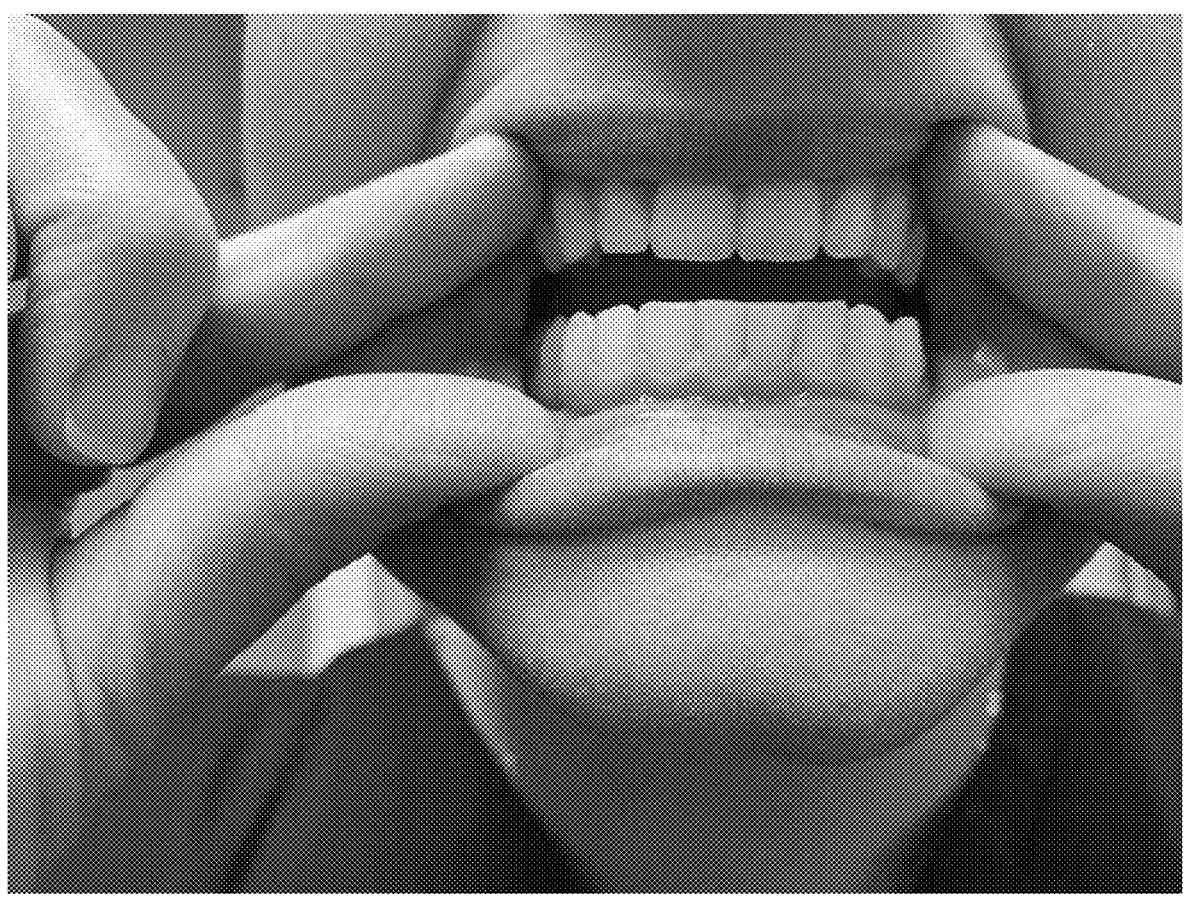

FIGS. 2A-1-2C-2 are drawings that illustrate an example of digital video captured at three different angles/positions for two different sets of teeth. FIGS. 4A-4C are pictures (still images) that illustrate an example of digital image information (e.g., digital video or digital still images) captured at three different angles/positions for a set of teeth that exhibits relatively normal flatness. As shown in FIGS. 4A-4C, the relatively normal flatness of the teeth is apparent from all three angles/positions. FIGS. 5A-5C and 6A-6C are pictures (still images) that illustrate two examples of digital video captured at three different angles/positions for two different sets of teeth that exhibit a relatively high degree of flatness. In FIGS. 5A-5C, the angle of the three images is approximately 110 degrees, 90 degrees, and 45 degrees relative to the vertical y-axis 104. As shown in FIGS. 5A-5C, the flatness of the set of teeth does not become readily apparent until the angle that corresponds to FIG. 5C, e.g., approximately 45 degrees. For example, at the angle/position corresponding to FIG. 3C, the degree of flatness is visible to the human eye and/or can be identified/detected by digital image processing. In FIGS. 6A-6C, the angle of the three images is approximately 135 degrees, 110 degrees, and 90 degrees relative to the vertical y-axis. As shown in FIGS. 6A-6C, the flatness of the set of teeth does not become readily apparent until the angle that corresponds to FIG. 6C, e.g., approximately 90 degrees. For example, at the angle/position corresponding to FIG. 6C, the degree of flatness is visible to the human eye and/or can be identified/detected by digital image processing. FIGS. 5A-5C and 6A-6C show that the ideal angle for revealing the flatness of the teeth can be different for different sets of teeth. In particular, in the example of FIGS. 5A-5C and 6A-6C, the angle that best reveals the flatness of the teeth as shown in FIG. 5C (approximately 45 degrees) is different from the angle that best reveals the flatness of the teeth as shown in FIG. 6C (approximately 90 degrees). Thus, in an embodiment, it is desirable to capture digital video over a range of angles to ensure that digital video is captured at an angle that exposes flatness that may exist.

In an embodiment, digital image processing techniques are used to determine a flatness parameter of the set of teeth. For example, the flatness parameter may be an indication of the degree of flatness, such as a number-based or letter-based flatness parameter. In an embodiment, a scale of flatness is used in which a low number indicates a normal degree of flatness and a high number indicates a high degree of flatness, e.g., a "0-10" scale in which "0" corresponds to normal flatness and "10" corresponds to extreme flatness. In another embodiment, a letter system can be implemented for the flatness parameter, such as, N=normal flatness, SF=somewhat flat, S=flat, and EF=extremely flat. Although some examples of flatness parameters are described, it should be understood that other flatness parameters, which correspond to a degree of flatness, are possible.

In an embodiment, the flatness parameter is determined by the application running on the smartphone via digital image processing of the digital image information (e.g., digital video and/or digital still images) that is captured by a digital camera of a smartphone using, for example, the above-described processes. For example, digital image processing techniques that identify the contrast in color and/or brightness between the teeth and the space between the upper and lower teeth can be used to identify a contour of the teeth. The contour of the teeth can then be translated to a flatness parameter. Although an example of a digital image processing technique for determining a flatness parameter is described, other techniques for determining a flatness parameter are possible. Additionally, although the flatness parameter is described as being determined by the application running on the smartphone, in another embodiment, the flatness parameter may be determined by image processing of the captured digital video on a different computing device that is remote from the smartphone. In an embodiment, a flatness parameter that corresponds to a determined contour may be determined relative to a straight line. For example, the flatness parameter may be a measure of the degree to which the contour deviates from a straight line.

As described above, digital video is captured to determine fitness for a dental splint. In an embodiment, the quality of the captured digital video is analyzed by the application to determine whether or not the captured digital video is of sufficient quality to enable a fitness determination. For example, the application may analyze whether the quality of the captured digital video enables a flatness parameter to be determined. If the application determines that the captured digital video is of insufficient quality to determine a flatness parameter, the application may prompt the user to redo the evaluation process, or to redo some portion of the process.

Once the flatness parameter is determined, fitness evaluation rules are applied by the application running on the smartphone to determine the fitness for a dental splint. For example, if the flatness parameter is a value on a scale of 0-10, a fitness evaluation rule may deem anyone with a flatness parameter of 6 or greater as a candidate for a dental splint. Likewise, if the flatness parameter is a letter value of N (e.g., normal flatness), SF (e.g., somewhat flat), F (e.g., flat), and EF (e.g., extremely flat), a fitness evaluation rule may deem anyone with a flatness parameter of F or EF as a candidate for a dental splint. Although examples of fitness evaluation rules are provided, other fitness evaluation rules are possible. In an on-phone evaluation mode, the application implements the digital image processing and applies the fitness evaluation rules and in an off-phone evaluation mode the digital video is transmitted from the smartphone for digital image processing and application of the fitness evaluation rules by a remote processor and the results of the fitness evaluation are transmitted back to the smartphone. In other embodiments, the fitness for a dental splint may be evaluated by a person such as a dental professional based on the digital video captured by the application.

Once the fitness for a dental splint is determined by the application running on a smartphone, or received from a remote processor or remote dental professional, the application running on the smartphone displays on its graphical user interface an indication of the fitness for a dental splint. For example, the application may display a message reading "you are a candidate for a dental splint," or a message reading "you are not a candidate for a dental splint." The application may communicate the results of the evaluation in other ways, including for example, with other words, with graphics, and/or with sounds.

Once it has been determined through the application running on the smartphone that a person is a candidate for dental splint, the application can transition to a process for capturing digital data for fabricating a dental splint.

A dental splint can be an effective way to treat TMJ disorder. A conventional process for obtaining a dental splint involves having a dentist take a plaster impression of the teeth and then sending the plaster impression to a splint fabrication facility. More recently, dentists have employed digital impression systems such as the CARESTREAM DENTAL CS 1500 intraoral camera. Such digital impression systems involve inserting a sensor wand into the person's mouth to capture a digital impression that can then be used to make a digital splint. In either case, obtaining a dental splint involves a trip to a dental office, which can be a time-consuming and costly endeavor. In accordance with an embodiment of the invention, a smartphone and smartphone application, referred to herein as the application, are used to capture digital data (e.g., digital image information that may include digital video, digital still images, and/or depth information) that can be used to fabricate a dental splint. In an embodiment, a method for capturing digital data (e.g., digital image information that may include digital video, digital still images, and/or depth information) for fabricating a dental splint involves displaying a GUI on a display of a smartphone that provides an alignment feature for a user to align a camera of the smartphone to a first position that captures teeth of a person, receiving digital video of the teeth of the person from the camera of the smartphone, overlaying the alignment feature on the digital video of the teeth on the display of the smartphone, moving the alignment feature (e.g., in vertical and horizontal directions) on the screen in a manner that causes the user to move the smartphone relative to the teeth to maintain alignment with the alignment feature, and capturing digital image information (e.g., which may include digital video, digital still images, and/or depth information) of the teeth as the alignment feature is moved. The captured digital image information (or some digital information that is generated from the captured digital image information) is then transmitted from the smartphone for use in fabricating a dental splint. In an embodiment, the captured digital image information (e.g., which may include digital video, digital still images, and/or depth information) is evaluated by the application on the smartphone to determine a quality parameter of the captured digital image information (e.g., which may include digital video, digital still images, and/or depth information) before transmission from the smartphone. If the captured digital image information (e.g., which may include digital video, digital still images, and/or depth information) is not of sufficient quality, the user may be prompted to repeat the process. The captured digital image information may include digital video, digital still images, and/or depth information. In an embodiment, depth information is captured on a per-pixel basis for digital video frames and/or digital still image frames.

It is known that a dental splint can be fabricated from a digital impression. As described above, an application is used to capture digital image information (e.g., which may include digital video, digital still images, and/or depth information) and the captured digital image information (e.g., which may include digital video, digital still images, and/or depth information) is used to fabricate a dental splint. In an embodiment, the digital image information (e.g., which may include digital video, digital still images, and/or depth information) is captured using a camera of the smartphone and a graphical user interface that guides the user to move the camera in a pattern that enables capture of digital image information (e.g., which may include digital video, digital still images, and/or depth information) of sufficient quality to be able to produce a digital file that represents the three-dimensional (3D) surfaces of the teeth. In an embodiment, a dental splint is form-fitted to engage some of the teeth, and thus it is important to capture digital image information (e.g., which may include digital video, digital still images, and/or depth information) of the teeth in a manner so that the 3D surfaces captured in the digital image information (e.g., which may include digital video, digital still images, and/or depth information) can be converted to a digital file that represents the desired 3D surfaces. In an embodiment, the digital image information (e.g., which may include digital video, digital still images, and/or depth information) is captured with multiple cameras (e.g., dual or triple cameras) and depth sensors embedded into the smartphone to obtain 3D data.

The teeth with which the dental splint engages could be different for different people. In some embodiments, the dental splint may be a top (maxillary) splint that engages some of the top teeth, e.g., the anteriors, the premolars, the molars, or some combination thereof. In other embodiments, the dental splint may be a bottom (mandibular) splint that engages some of the bottom teeth, e.g., the anteriors, the premolars, the molars, or some combination thereof.

In still other embodiments, the dental splint may be a top (maxillary) and a bottom (mandibular) dental splint that that engages some of the top and bottom teeth, e.g., the anteriors, the premolars, the molars, or some combination thereof. Therefore, in an embodiment, the teeth that should be captured in the digital image information (e.g., which may include digital video, digital still images, and/or depth information) are a function of the teeth that the dental splint are meant to engage.

Figure 7A:
FIGS. 7A-7C illustrate three different vertical positions of the smartphone relative to the teeth of a person doing a self evaluation.
Figure 7B:
Figure 7C:
Figure 8A:
FIGS. 8A-8C illustrate three different horizontal positions of the smartphone relative to the teeth of a person doing a self evaluation.
Figure 8B:
Figure 8C:
Figure 9:
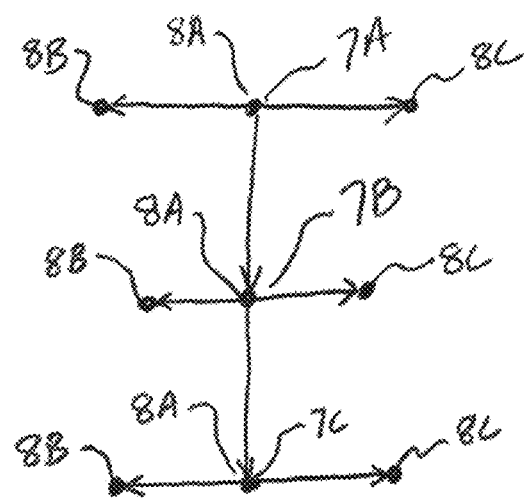
FIG. 9 is a graphical representation of the pattern of movement of the smartphone relative to the teeth of the user that corresponds to the movements shown in FIGS. 7A-7C and 8A-8C.

In an embodiment, the process for capturing digital image information (e.g., which may include digital video, digital still images, and/or depth information) for fabricating a dental splint is similar to the process for capturing digital image information (e.g., which may include digital video, digital still images, and/or depth information) for use in evaluating the fitness for a dental splint. An example process for capturing digital image information (e.g., which may include digital video, digital still images, and/or depth information) for fabricating a dental splint is described with reference to FIGS. 7A-8C. In an embodiment, digital image information (e.g., which may include digital video, digital still images, and/or depth information) is captured with a combination of vertical and horizontal movements of the camera (e.g., and corresponding depth sensor) relative to the teeth that are controlled by movement of an alignment feature of the graphical user interface on the smartphone. FIGS. 7A-7C illustrate three different vertical positions of the smartphone relative to the teeth of a person doing a self evaluation and FIGS. 8A-8C illustrate three different horizontal positions of the smartphone relative to the teeth that are used to capture digital image information (e.g., which may include digital video, digital still images, and/or depth information). In an embodiment, the alignment feature of the GUI moves on the display of the smartphone to cause the user to move the smartphone in a vertical direction and to pause the vertical motion at three different vertical angles/positions (e.g., as shown in FIGS. 7A-7C) and to move the smartphone horizontally relative to the teeth, e.g., from the position of FIG. 8A, then to the position of FIG. 8B, then to the position of FIG. 8C, and then back to the position of FIG. 8A, at each of the three different vertical positions. Thus, the process of horizontal movement is repeated at each of the three different vertical angles. The movement that is directed by the alignment feature of the GUI on the display of the smartphone causes the user to move the smartphone in a pattern relative to the teeth and digital image information (e.g., which may include digital video, digital still images, and/or depth information) is captured during the movement. FIG. 9 is a graphical representation of the pattern of movement of the smartphone relative to the teeth of the user that corresponds to the movements shown in FIGS. 7A-7C and 8A-8C. As illustrated in FIG. 9, the smartphone (and corresponding camera) starts in vertical position 7A and moves through horizontal positions 8A-8C, then moves to vertical position 7B and moves through horizontal positions 8A-8C, then moves to vertical position 7B and moves through horizontal positions 8A-8C. Although an example of a pattern of movement of the smartphone for digital image information (e.g., which may include digital video, digital still images, and/or depth information) capture is described with reference to FIGS. 7A-9, other patterns of movement of the smartphone for digital image information (e.g., which may include digital video, digital still images, and/or depth information) capture are possible as long as the pattern of movement enables capture of sufficient digital image information (e.g., which may include digital video, digital still images, and/or depth information) to generate the desired 3D file. Additionally, although a pattern of movement that includes only linear movements is described, patterns of movement that include curved movement, and/or a combination of linear and curved movement are also possible.

In an embodiment, once the digital image information (e.g., which may include digital video, digital still images, and/or depth information) is captured by the smartphone, the digital image information (e.g., which may include digital video, digital still images, and/or depth information) is evaluated, e.g., by the application running on the smartphone, to determine if the digital image information (e.g., which may include digital video, digital still images, and/or depth information) is of sufficient quality to generate a digital file that can be used to fabricate a dental splint. For example, the quality of the captured digital image information (e.g., which may include digital video, digital still images, and/or depth information) may be a function of the lighting during the capture process. Other factors may affect the quality of the captured digital image information (e.g., which may include digital video, digital still images, and/or depth information). If the digital image information (e.g., which may include digital video, digital still images, and/or depth information) is determined to be of sufficient quality, then the process proceeds to next steps. However, if the digital image information (e.g., which may include digital video, digital still images, and/or depth information) is not of sufficient quality, the application may prompt the user to redo the digital image information (e.g., which may include digital video, digital still images, and/or depth information) capture process.

Once the captured digital image information (e.g., which may include digital video, digital still images, and/or depth information) is determined to be of sufficient quality to generate the desired 3D digital file, the digital image information (e.g., which may include digital video, digital still images, and/or depth information) can be transmitted from the smartphone for processing to generate a 3D digital file. In another embodiment, the digital image information (e.g., which may include digital video, digital still images, and/or depth information) is processed on the smartphone to generate a desired 3D digital file. In still another embodiment, the digital image information (e.g., which may include digital video, digital still images, and/or depth information) can be partially processed by the smartphone into an intermediate file format before being transmitted from the smartphone for subsequent processing to generate the desired 3D file.

Once a desired 3D digital file of the teeth is generated, the 3D digital file can be transmitted from the smartphone for use in fabricating a dental splint.

Although the above-described techniques are described in the context of a smartphone, in other embodiments, the techniques may be implemented with other types of computing device, such as for example, a pad computer, or other portable computing device that includes an image capture device.

Figure 10:
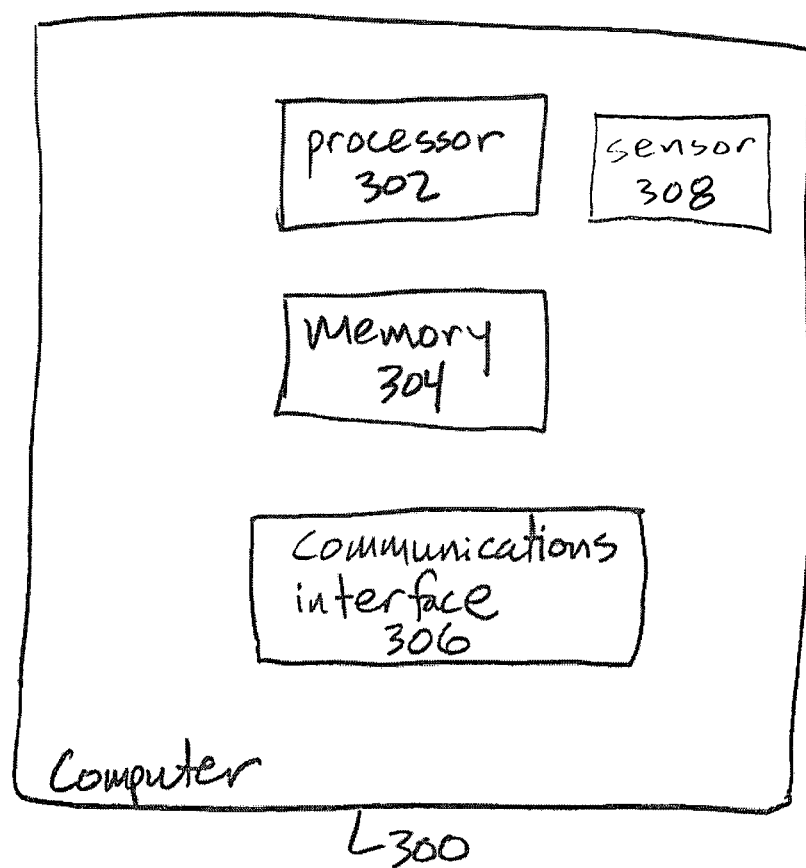
FIG. 10 depicts a computer (e.g., a smartphone) that includes a processor, memory, a communications interface, and a sensor.

In an embodiment, the functionality of the application is performed by a computer device, such as a smartphone, that executes computer readable instructions (software). FIG. 10 depicts a computer 300 (e.g., a smartphone) that includes a processor 302, memory 304, a communications interface 306, and a sensor 308. The processor may include a multi-function processor and/or an application-specific processor. Examples of processors include the PowerPC™ family of processors by IBM and the x86 family of processors by Intel. The memory within the computer may include, for example, storage medium such as read only memory (ROM), flash memory, RAM, and a large capacity permanent storage device such as a hard disk drive. The communications interface enables communications with other computers via, for example, the Internet Protocol (IP). The sensor may include a camera (e.g., including one or more lenses and sensor arrays) and/or a depth sensor as, for example, are found in smartphones. In an embodiment, the term "camera" may be used to refer to a sensor that includes both an image sensor and a depth sensor. In an embodiment, the depth sensor may capture per-pixel depth information that is capture simultaneously with frames of image information. The computer executes computer readable instructions stored in the storage medium to implement various tasks as described above.

In an embodiment, a method for determining fitness for a dental splint is disclosed. The method involves starting evaluation application on a smartphone, activating camera of the smartphone, moving the smartphone relative to the teeth of the person as directed by a GUI of the application on a display of smartphone, and deactivating the camera as directed by the GUI of the application.

In another embodiment, a method for determining fitness for a dental splint is disclosed. The method involves starting evaluation application on a smartphone, activating camera of the smartphone, holding the smartphone so that the camera captures the person's teeth and such that a display of the camera is visible to the use, moving the smartphone relative to the teeth of the person as directed by a GUI of the application on a display of smartphone, and deactivating the camera as directed by the GUI of the application.

In an embodiment, a method for determining fitness for a dental splint is disclosed. The method involves displaying a GUI on a display of a smartphone that provides an alignment feature for a user to align a camera of the smartphone to a first position that captures teeth of a person, receiving digital video of the teeth of the person from the camera of the smartphone, overlaying the alignment feature on the digital video of the teeth on the display of the smartphone, moving the alignment feature on the screen in a manner that causes the user to move the smartphone relative to the teeth to maintain alignment with the alignment feature, capturing digital video of the teeth as the alignment feature is moved, evaluating the captured digital video of the teeth to determine a flatness parameter of the teeth.

In another embodiment, a method for determining fitness for a dental splint is disclosed. The method involves displaying a GUI on a display of a smartphone that provides an alignment feature for a user to align a camera of the smartphone to a first position that captures teeth of a person, receiving digital video of the teeth of the person from the camera of the smartphone, overlaying the alignment feature on the digital video of the teeth on the display of the smartphone, moving the alignment feature on the screen in a manner that causes the user to move the smartphone relative to the teeth to maintain alignment with the alignment feature, capturing digital video of the teeth as the alignment feature is moved, and transmitting the captured video from the smartphone for evaluation to determine a flatness parameter of the teeth.

In an embodiment of a method, the alignment feature moves in a vertical direction on the screen of the smartphone.

In an embodiment of a method, the alignment feature moves in a direction that causes the user to move the smartphone in a vertical direction relative to the teeth.

In an embodiment of a method, the application is configured to determine a flatness parameter in response to the captured digital video.

In an embodiment of a method, an application on the smartphone is configured to implement digital image processing to determine a flatness parameter in response to the captured digital video.

In an embodiment of a method, the application is configured to determine a fitness for a dental splint as a function of the flatness parameter.

In an embodiment of a method, an application on the smartphone is configured to evaluate the quality of the captured digital video to determine if a flatness parameter can be determined.

In an embodiment of a method, the application is configured to trigger a redo of the digital video capture process of the quality evaluate the quality of the captured digital video to determine if a flatness parameter can be determined.

A method for capturing digital data for fabricating a dental splint is disclosed. The method involves starting a capture application on a smartphone, activating a camera of the smartphone, holding the smartphone so that the camera captures the person's teeth and such that a display of the camera is visible to a user, moving the smartphone relative to the teeth of the person as directed by a GUI of the application on a display of smartphone, and deactivating the camera as directed by the GUI of the application.

Another embodiment of a method for capturing digital data for fabricating a dental splint is disclosed. The method involves displaying a GUI on a display of a smartphone that provides an alignment feature for a user to align a camera of the smartphone to a first position that captures teeth of a person, receiving digital image information of the teeth of the person from the camera and/or the depth sensor of the smartphone, overlaying the alignment feature on the digital video of the teeth on the display of the smartphone, moving the alignment feature on the screen in a manner that causes the user to move the smartphone relative to the teeth to maintain alignment with the alignment feature, capturing digital image information of the teeth as the alignment feature is moved, evaluating the captured digital image information of the teeth to determine a quality parameter of the captured digital image information, and transmitting the captured image information from the smartphone for use in fabricating a dental splint.

Another embodiment of a method for capturing digital data for fabricating a dental splint is disclosed. The method involves displaying a GUI on a display of a smartphone that provides an alignment feature for a user to align a camera of the smartphone to a first position that captures teeth of a person, receiving digital video of the teeth of the person from the camera of the smartphone, overlaying the alignment feature on the digital video of the teeth on the display of the smartphone, moving the alignment feature on the screen in a manner that causes the user to move the smartphone relative to the teeth to maintain alignment with the alignment feature, capturing digital image information of the teeth as the alignment feature is moved, evaluating the captured digital image information of the teeth to determine a quality parameter of the captured digital image information, causing additional digital image data to be captured if the quality parameter is below a quality parameter threshold, and transmitting the captured image data from the smartphone for use in fabricating a dental splint.

In an embodiment, the method involves generating a digital file of 3D data from the captured digital image data/information.

In an embodiment, the digital file of 3D data is in .STL file format.

Another embodiment for capturing digital data for fabricating a dental splint is disclosed. The method involves displaying a GUI on a display of a smartphone that provides an alignment feature for a user to align a camera of the smartphone to a first position that captures teeth of a person, receiving digital video of the teeth of the person from the camera of the smartphone, overlaying the alignment feature on the digital video of the teeth on the display of the smartphone, moving the alignment feature on the screen in a manner that causes the user to move the smartphone relative to the teeth to maintain alignment with the alignment feature, capturing digital image information (e.g., digital video, digital still images, and/or depth information) of the teeth as the alignment feature is moved, processing the captured digital image information on the smartphone to generate a 3D digital file, and transmitting the 3D digital file from the smartphone for use in fabricating a dental splint.

In an embodiment, the 3D file is in .STL format.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

While the above-described techniques are described in a general context, those skilled in the art will recognize that the above-described techniques may be implemented in software, hardware, firmware or any combination thereof. The above-described embodiments of the invention may also be implemented, for example, by operating a computer system to execute a sequence of machine-readable instructions. The instructions may reside in various types of computer readable media. In this respect, another aspect of the present invention concerns a programmed product, comprising computer readable media tangibly embodying a program of machine readable instructions executable by a digital data processor to perform the method in accordance with an embodiment of the present invention. The computer readable media may comprise, for example, RAM (not shown) contained within the computer. Alternatively, the instructions may be contained in another computer readable media such as a magnetic data storage diskette and directly or indirectly accessed by a computer system. Whether contained in the computer system or elsewhere, the instructions may be stored on a variety of machine readable storage media, such as a DASD storage (e.g. a conventional "hard drive" or a RAID array), magnetic tape, electronic read-only memory, an optical storage device (e.g., CD ROM, WORM, DVD, digital optical tape), paper "punch" cards, or other suitable computer readable media including transmission media such as digital, analog, and wireless communication links. In an illustrative embodiment of the invention, the machine-readable instructions may comprise lines of compiled C, C++, or similar language code commonly used by those skilled in the programming for this type of application arts.

Although specific embodiments of the invention have been described and illustrated, the invention is not to be limited to the specific forms or arrangements of parts as described and illustrated herein. The invention is limited only by the claims.

What is claimed is:

1. A method for capturing digital data for fabricating a dental splint, the method comprising:
displaying a GUI on a display of a smartphone that provides an alignment feature for a user to align a camera of the smartphone to a first position that captures teeth of a person;
receiving digital video of the teeth of the person from the camera of the smartphone;
overlaying the alignment feature on the digital video of the teeth on the display of the smartphone to show alignment between the teeth and the alignment feature;
capturing digital image information of the teeth while the alignment feature overlaps with the teeth on the display of the smartphone, the captured digital image information including depth information, the captured digital image information being captured with the camera and a depth sensor of the smartphone; and
transmitting the captured digital image information, including the depth information, from the smartphone for use in fabricating a dental splint.

2. The method of claim 1, wherein the depth information is captured on a per-pixel basis.

3. The method of claim 1, wherein the depth information is captured on a per-pixel basis, and further comprising generating a digital file of 3D data from the captured digital image information for use in fabricating the dental splint.

4. The method of claim 1, further comprising generating a digital file of 3D data from the captured digital image information for use in fabricating the dental splint.

5. The method of claim 4, wherein the digital file of 3D data is in .STL file format.

6. The method of claim 1, wherein the digital image information includes digital video.

7. The method of claim 1, wherein the digital image information includes digital still images.

8. The method of claim 1, wherein the digital image information is captured from multiple cameras of the smartphone.

9. A method for capturing digital data for fabricating a dental splint, the method comprising:
displaying a GUI on a display of a smartphone that provides an alignment feature for a user to align a camera of the smartphone to a first position that captures teeth of a person;
receiving digital video of the teeth of the person from the camera of the smartphone;
overlaying the alignment feature on the digital video of the teeth on the display of the smartphone to show alignment between the teeth and the alignment feature;
capturing digital image information of the teeth while the alignment feature overlaps with the teeth on the display of the smartphone, the captured digital image information including depth information, the captured digital image information being captured with the camera and a depth sensor of the smartphone;
evaluating the captured digital image information to determine a quality parameter of the captured digital image information;
causing additional digital image information to be captured if the quality parameter is below a quality parameter threshold; and
transmitting the captured digital image information, including the depth information, from the smartphone for use in fabricating a dental splint.

10. The method of claim 9, wherein the depth information is captured on a per-pixel basis.

11. The method of claim 9, wherein the depth information is captured on a per-pixel basis, and further comprising generating a digital file of 3D data from the captured digital image information for use in fabricating the dental splint.

12. The method of claim 9, further comprising generating a digital file of 3D data from the captured digital image information for use in fabricating the dental splint.

13. The method of claim 12, wherein the digital file of 3D data is in .STL file format.

14. The method of claim 9, wherein the digital image information includes digital video.

15. The method of claim 9, wherein the digital image information includes digital still images.

16. The method of claim 9, wherein the digital image information is captured from multiple cameras of the smartphone.

\* \* \* \* \*